March 2, 1954
J. H. WITTMANN
2,670,938
OSCILLATORY MIXING DEVICE
Filed July 25, 1952
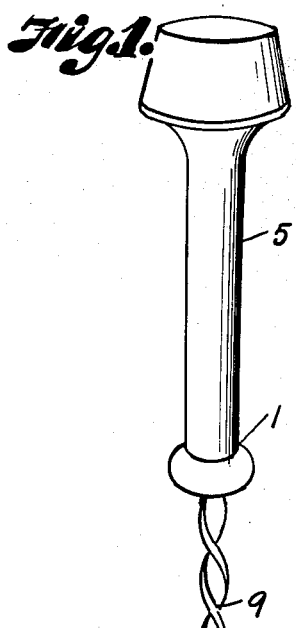
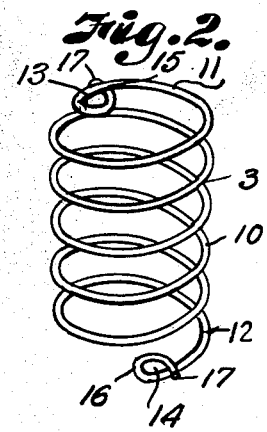
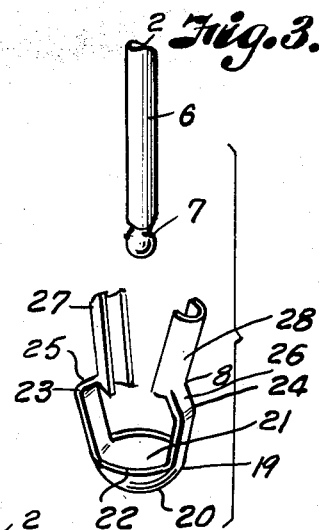
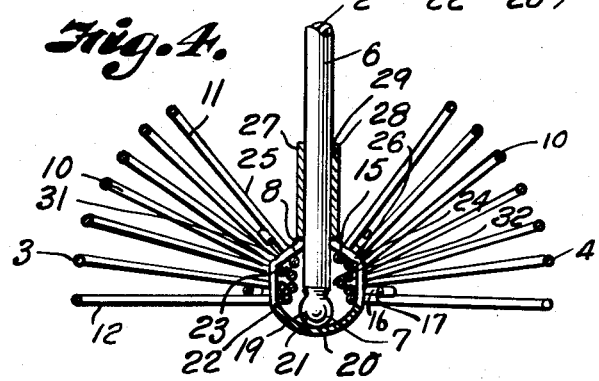
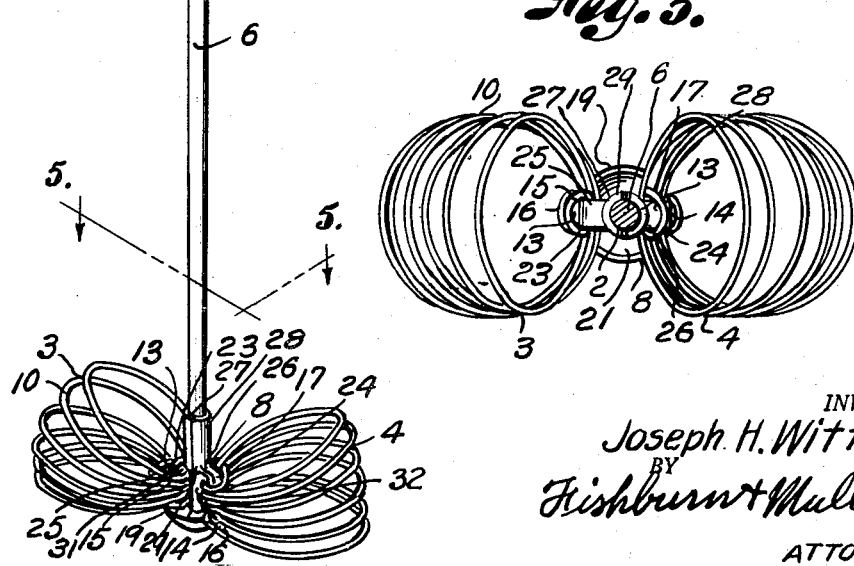
INVENTOR.
Joseph H. Wittmann
BY Fishburn + Mullendore
ATTORNEYS.

Patented Mar. 2, 1954

2,670,938

UNITED STATES PATENT OFFICE 2,670,938

OSCILLATORY MIXING DEVICE

Joseph H. Wittmann, Santa Monica, Calif.

Application July 25, 1952, Serial No. 300,811

6 Claims. (Cl. 259—128)

This invention relates to mixing devices particularly adapted for whipping cream, mixing liquids, or mixing liquids with various ingredients, the present invention being an improvement in the whipping device covered in my Patent No. 2,278,398, March 31, 1942. As disclosed in this patent, the whipping device discloses a manually oscillatable shaft having a bearing end adapted to engage the bottom of a vessel and which carries a plurality of mixing elements in the form of wire coils having the ends brought together and secured to the shaft near the bearing portion thereof to form a plurality of circular loops extending in substantially radial directions from the point of attachment with the lowermost loops bearing in scraping contact with the bottom of the vessel.

The principal object of the present invention is to provide an improved connection of the mixing elements with the shaft whereby the coils of the mixing elements are kept in orderly arrangement and free floating to maintain contact with the bottom of a mixing vessel. Another object is to provide a relatively larger bearing element for the shaft.

Other objects of the invention are to provide the endmost coils with eyes having terminal portions disposed on inner sides of the endmost loops to lock the coils on the bearing element of the shaft without soldering, welding or the like; to simplify assembly; to provide a structure which eliminates and tendency of the mixing elements to become entangled; to provide a structure which permits manufacture of the parts from stainless metal; and to provide bearing and mixing elements which are easily cleaned and kept in sanitary condition.

In accomplishing these and other objects of the invention hereinafter pointed out, I have provided improved structure, the preferred form of which is illustrated in the accompanying drawing wherein:

Fig. 1 is a perspective view of a mixing device embodying the features of the present invention.

Fig. 2 is a perspective view of one of the mixing elements with the coil thereof in extended condition.

Fig. 3 is a perspective view of the lower end of the shaft and the bearing element therefor shown in disassembled spaced relation to better illustrate the construction.

Fig. 4 is an enlarged section through the mixing elements and bearing member.

Fig. 5 is a horizontal section through the shaft on the line 5—5 of Fig. 1.

Referring more in detail to the drawing:

1 designates a mixing device constructed in accordance with the present invention and which includes an operating shaft 2, mixing or agitating elements 3 and 4 and a handle 5.

The operating shaft includes a relatively rigid rod-like body 6 terminating in a preferably rounded end 7 that has contact in a bearing member 8 which engages the bottom of a mixing vessel (not shown) and which attaches the mixing elements 3 and 4 as later described.

The upper portion of the shaft is shaped to provide a flat, spiral thread 9 that is adapted to engage a suitable mechanism (not shown) in the handle 5 to effect rotation of the shaft first in one direction under pressure applied to the handle and in the opposite direction responsive to expansion of the spring as disclosed in the above mentioned patent, the specific operating mechanism forming no part of the present invention in that the shaft may be oscillated in any suitable manner.

The mixing or agitating elements 3 and 4 are formed of flexible wire-like material of resilient character and wound into helical form as shown in Fig. 2 to provide a plurality of convolutions 10. The endmost convolutions 11 and 12 terminate in eyes 13 and 14 that are formed by bending the ends of the wire-like material to form relatively small circular loops 15 and 16 with the terminals 17 thereof in contact with the inner side of the endmost convolutions to close the eyes 13 and 14 as shown in Fig. 2. This is effected by forming the eyes in reverse direction to the coiling of the convolutions 11 and 12.

The bearing member 8 includes a relatively large cup-like portion 19 having a convexly rounded bearing surface 20 adapted to engage the bottom of the mixing vessel and a concave inner surface 21 for receiving the rounded end 7 of the shaft 2. Extending from the rim portion 22 are bracket portions 23 and 24 having inwardly extending portions 25 and 26 carrying substantially semicylindrical terminals 27 and 28, which when brought into contact about the shaft 2, form a tubular sleeve 29 which may be suitably secured to the shaft 6 as by spot-welding or soldering or any other suitable manner so that the bearing member turns with the shaft upon manipulation of the handle 5. When the bearing member is attached to the shaft, the leg portions 23 and 24 and the inturned portions 25 and 26 cooperate with the shaft to form diametrically disposed closed loops 31 and 32 to which the mixing elements 3 and 4 are attached as now to be described.

In attaching the mixing elements, the leg portions 23 and 24 extend through the innermost convolutions 10, and the endmost convolutions 11 and 12 are secured with the eyes thereof threaded on the leg portions so that the convolutions are supported in radial position as shown in Fig. 4, with the endmost convolutions 12 adapted to bear in scraping contact with the bottom of the mixing vessel and the other convolutions extending at different angles to provide the desired whipping and mixing contacts.

The parts thus described may be assembled in a convenient manner, for example, by passing the eyes 14 and then convolutions 10 of the mixing elements, and then the eyes 13 over the respective opened-up portions 27 and 28 of the bearing member shown in Fig. 3 so that one coil is disposed at one side of the shaft and the other coil at the opposite side as shown in Figs. 4 and 5. The semicylindrical portions are then brought together around the shaft and secured in any suitable manner as by welding, soldering or similar connection so as to secure the bearing member and assure rotation thereof upon oscillation of the mixing shaft.

The construction described greatly simplifies the assembly of the parts and permits manufacture of the parts, and particularly the mixing elements from non-corrosive metal such as stainless steel or the equivalent. It is also obvious that the mixing elements when applied and secured by the bearing member are freely and floatingly retained so that they readily adjust themselves to the formation of the bottom of the mixing vessel, with the lower coils being adapted to bear in contact therewith to scrape up and keep the bottom of the vessel free of settling material when the mixing device is in use.

In using the mixing device, the mixing elements and shaft are inserted through the open top of a mixing vessel (not shown) so that the rounding end of the bearing member engages upon the bottom of the vessel, after which pressure is alternately applied and released from the handle of the device to effect oscillation of the mixing elements in whirling and whipping contact with the material to be mixed.

Attention is directed to the fact that the method of applying the mixing elements assures the desired spring action so that the convolutions are retained in extended position to effectively and thoroughly mix the material, for example, as when whipping cream, beating eggs or mixing materials in various liquids. The eye mounting of the whipping elements on the leg portions of the bearing member provides limit stops in an upward direction by the portions 25 and 26 and in a downward direction by the rim 22. The reverse direction of the eyes lock the ends of the coils on the bearing member, it being obvious that the terminals 17 underlapping the endmost coils form locks or keepers to prevent displacement of the eyes from the bracket portions 23 and 24. Therefore, the mixing elements cannot become entangled with one and the other but are positively retained on their respective sides of the shaft because of the eye connections with the bearing member. It is obvious that the concavo-convex portion of the bearing member provides an extended smoothly rounded surface for contact with the bottom of a mixing bowl to avoid scratching and drilling of the shaft into the bowl, particularly when the bowl is formed of glass, soft plastic or wood. It is also obvious that the coils forming the mixing element cannot slip over to one side of the shaft particularly when whipping heavy batters and more viscous materials. It is also impossible for the mixing elements to be turned over the end of the shaft when the shaft is lifted in the operation of the mixing device.

What I claim and desire to secure by Letters Patent is:

1. A mixing device of the type including a shaft, a bearing member on one end of the shaft, an oscillating mechanism on the other end of the shaft, and mixing elements carried by the bearing member wherein said bearing member has a concavo-convex bearing portion and leg portions extending from opposite diametrical sides of the concavo-convex bearing portion and having terminal portions connected with said shaft at points spaced from said concavo-convex bearing portion to cooperate with the shaft and said concavo-convex bearing portion in forming loops on opposite diametric sides of the shaft, and said mixing elements comprising helical coils having intermediate convolutions passing through said loops and having eyes on the endmost convolutions which encircle said leg portions.

2. A mixing device of the type including a shaft, a bearing member on one end of the shaft, an oscillating mechanism on the other end of the shaft, and mixing elements carried by the bearing member wherein said bearing member has a concavo-convex bearing portion and leg portions extending from opposite diametrical sides of the concavo-convex bearing portion and having semicylindrical terminal portions embracing said shaft and connected therewith at points spaced from the concavo-convex bearing portion, said leg portions cooperating with the concavo-convex bearing portion in forming loops on opposite diametrical sides of the shaft, and said mixing elements comprising helical coils having intermediate convolutions passing through said loops and having eyes on the endmost convolutions which encircle said leg portions.

3. A mixing device of the type including a shaft, a bearing member on one end of the shaft, and mixing elements carried by the bearing member wherein said bearing member has a concavo-convex bearing portion and leg portions extending from opposite diametrical sides of the concavo-convex bearing portion and having terminal portions connected with said shaft at points spaced from said concavo-convex bearing portions to cooperate with said concavo-convex bearing portions and the shaft in forming closed loops on opposite diametric sides of the shaft, and said mixing elements comprising helical coils passing through said loops.

4. In a mixing device, a shaft having opposed loop portions, and mixing elements consisting of helical wire members having intermediate convolutions in gathered relation on one diametrical side of said elements and extending through said loop portions to anchor said convolutions in diametrical alignment on opposite sides of the shaft and to effect spreading apart of the respective convolutions at the opposite diametrical sides of the elements, said endmost convolutions of each mixing element being connected with said loop portions above and below said gathered portions of the intermediate convolutions.

5. In a mixing device, a shaft having opposed loop portions, and mixing elements consisting of helical wire members having intermediate convolutions in gathered relation on one diametrical side of said elements and extending through said loop portions to anchor said convolutions in diametrical alignment on opposite sides of the shaft and to effect spreading apart of the respective convolutions at the opposite diametrical sides of the elements, and the endmost convolutions having eyes connected with said loop portions above and below said gathered portions of the intermediate convolutions.

6. In a mixing device for mixing materials in a bowl, a bearing member including a concavo-convex bearing portion covering an end of the shaft and of larger diameter than the shaft to form an extended bearing surface adapted to bear upon the bottom of the bowl, and having leg portions connected with opposite edges of the concavo-convex portion and having terminals connected with the shaft at points spaced from said concavo-convex portion to form with the shaft and said concavo-convex portion closed loops, and mixing elements consisting of helical wire members having intermediate convolutions in gathered relation on one diametrical side of said elements and extending through said loops to anchor said convolutions in diametrical alignment on opposite sides of the shaft and to effect spreading apart of the convolutions at the opposite diametrical sides of the elements incidental to action of the convolutions and the endmost convolutions having eyes connected with said loop leg portions above and below said gathered portions of the intermediate convolutions.

JOSEPH H. WITTMANN.

References Cited in the file of this patent

UNITED STATES PATENTS

| Number | Name | Date |
| --- | --- | --- |
| 504,112 | Paine | Aug. 29, 1893 |
| 781,917 | Smith | Feb. 7, 1905 |
| 876,549 | Hoffmann | Jan. 14, 1908 |
| 2,278,398 | Wittmann | Mar. 31, 1942 |